US006207925B1

(12) United States Patent
Kendall

(10) Patent No.: US 6,207,925 B1
(45) Date of Patent: Mar. 27, 2001

(54) APPARATUS FOR CUTTING AND/OR WELDING FLEXIBLE PACKAGING

(76) Inventor: Brian Andrew Kendall, 13A Prictor Street, Papakura Auckland (NZ)

( * ) Notice: Subject to any disclaimer, the term of this patent is extended or adjusted under 35 U.S.C. 154(b) by 0 days.

(21) Appl. No.: 09/284,344

(22) PCT Filed: Oct. 9, 1997

(86) PCT No.: PCT/NZ97/00135

§ 371 Date: Apr. 8, 1999

§ 102(e) Date: Apr. 8, 1999

(87) PCT Pub. No.: WO98/16430

PCT Pub. Date: Apr. 23, 1998

(30) Foreign Application Priority Data

Oct. 11, 1996 (NL) ..................................................... 299559

(51) Int. Cl.[7] ........................... B23K 26/00; B23K 26/14; B23K 26/16; B23K 26/02

(52) U.S. Cl. ................................ 219/121.63; 219/121.64; 219/121.77; 219/121.67; 219/121.72; 219/121.83; 53/170

(58) Field of Search ......................... 219/121.77, 121.64, 219/121.63, 121.67, 121.72, 121.83; 53/170, 52, 396

(56) References Cited

U.S. PATENT DOCUMENTS 3,989,778 11/1976 Osborne .
4,414,051 11/1983 Bose .
4,490,203 12/1984 Bose .
4,549,063 10/1985 Ang et al. .
4,847,462 7/1989 Soodak et al. .
4,945,203 7/1990 Soodak et al. .
5,001,325 3/1991 Huizinga .
5,452,565 9/1995 Blom et al. .
5,630,308 5/1997 Guckenberger .
5,701,725 12/1997 Neri et al. .

FOREIGN PATENT DOCUMENTS 26 55 253 12/1976 (DE) .
1541214 2/1979 (GB) .

*Primary Examiner*—Patrick Ryan
*Assistant Examiner*—Colleen Cooke
(74) *Attorney, Agent, or Firm*—Scully, Scott, Murphy & Presser

(57) ABSTRACT

This invention involves a method and apparatus for welding and/or cutting flexible packaging material (1) using lasers. The invention is specifically directed towards the use of lasers for cutting and/or welding plastics material (1) in motion, such as in association with high speed packaging machinery. The method and apparatus of the invention enables the cutting and/or welding of adjacent webs of plastics material (1) by scanning one or more processing laser beams (4), or sub-beams (5, 6) of the or each processing laser beam (4), across said moving layers (1) at a rate controlled in relation to the rate of motion of the layers (1) of substrate. The method and apparatus may produce straight or shaped cuts and/or welds.

25 Claims, 1 Drawing Sheet

13
4
3
5
6
7
10
12
1
2
11
8
9

APPARATUS FOR CUTTING AND/OR WELDING FLEXIBLE PACKAGING

TECHNICAL FIELD

This invention relates to a method and apparatus for welding and/or cutting flexible packaging material using lasers.

BACKGROUND

Welding and cutting of plastics film or foil is particularly important with flexible packaging equipment, for example in the bag making industry, and also in form/fill/seal machinery.

There are three main methods for welding plastics film or foil utilised in packaging machinery. These are hot metal welding, radio frequency welding and ultrasonic welding.

All three of these methods have the disadvantage of requiring mechanical contact between the substrate to be welded and the cutting equipment. Mechanical contact can result in substrate sticking to the sealing/cutting equipment, and requires blades or the like which need regular sharpening, replacement, cleaning and maintenance. These known methods and apparatus are also mechanically complex.

Furthermore, machinery employing these methods requires a stop/start cycle, the stop component necessary to allow time for the mechanical contact between the welding head and the substrate to produce the required weld. Alternatively, the welding head may move with the substrate, but this requires multiple welding heads in order to achieve an acceptable processing speed. The requirement for multiple welding heads further adds to the mechanical complexity of the equipment.

Another difficulty associated with existing equipment employing welding heads is that some plastics materials are difficult to seal, and it may be impractical to weld thick gauge substrates, to weld plastic to metal foil, or to weld temperature-resistant materials.

Moreover, with hot metal, radio frequency and ultrasonic welding the focusing of heat may be poorly controlled making it difficult to weld or seal shrink film, for example. In addition, these conventional systems may require ramping in of dwell time and preheating of sealing mechanisms which add to their complexity. If they don't have such features then there are inefficiencies associated with scrap substrate.

Lasers are employed in the packaging industry in various capacities, including for producing score lines on plastics packaging material to facilitate opening of such packaging, and for cutting out and welding customised shapes of bags made of fluorocarbon materials. However, where such laser technology has been employed it has not generally been adapted for use in association with highspeed packaging machinery, In particular, the laser beams have been fixed, for the production of welds, seals or score lines in a longitudinal direction along a moving film, or means of lateral scanning have been inefficient, of limited lateral span and/or not designed for use with continuously moving webs or films of material.

Thus, it is an object of the present invention to provide a method and apparatus for welding and/or cutting flexible packaging material in motion, employing lasers which overcomes or reduces the above-mentioned problems, or which at least provides the public with a useful alternative.

Other objects of the present invention may become apparent from the following description which is given by way of example only.

DISCLOSURE OF INVENTION

According to one aspect of the present invention there is provided a method of cutting and/or welding flexible packaging material in motion, said method comprising:

feeding a substrate comprising two or more layers of flexible packaging material through an operational site, contacting adjacent layers of the material at said operational site, focusing one or more processing laser beams on said substrate at said operational site, scanning the or each processing laser beam on said moving substrate, by scanning means, to produce one or more cuts and/or welds in said substrate, and controlling the relationship between the rate of scanning and the rate of motion of the substrate to produce the one or more required cuts and/or welds.

In one preferred method of the invention the scanning may comprise directing the or each processing laser beam at a scanning mirror and pivoting said mirror to produce the required scan of the beam on the moving substrate.

Preferably, there may be a plurality of processing laser beams and scanning means each scanning means adapted to scan a processing laser beam on a different part of the substrate so that each scan overlaps or interconnects with the or each adjacent scan.

In a further preferred form, the method of the present invention may further comprise dividing the or each processing laser beam into at least two sub-beams, realigning said sub-beams, and separately focusing each sub-beam.

Preferably, the or each processing laser beam may be divided into three sub-beams, one forming a central cutting beam and the other two forming lateral welding beams.

Preferably, the method may further comprise interrupting, permanently or intermittently, one or more sub-beam.

In one preferred form, said method may further comprise modifying the power density of the or each processing laser beam and/or sub-beam.

Preferably, the rate of scanning in relation to the rate of motion of substrate may be adjustable during scanning to enable cuts/welds of predetermined shape to be made.

Preferably, the method may further comprise monitoring the progress of a substrate to correlate scanning with the location of indicators on the substrate.

According to a further aspect of the present invention there is provided apparatus for cutting and/or welding flexible packaging material in motion, said apparatus comprising:

feeding means adapted to feed a substrate comprising two or more layers of flexible packaging material through an operational site, contacting means adapted to produce intimate contact between adjacent layers of the substrate at said operational site, one or more lasers, adapted to produce one or more processing laser beams, focusing means adapted to focus the one or more processing laser beams on said substrate at the operational site, scanning means adapted to scan the one or more processing laser beams on the moving substrate to produce one or more cuts and/or welds in said substrate, and control means adapted to control the relationship between the rate of scanning and the rate of motion of the substrate to produce one or more required cuts and/or welds.

Preferably, there may be a plurality of scanning means each adapted to scan a part of the substrate so that each scan overlaps or interconnects with the or each adjacent scan.

In one preferred form of apparatus of the present invention the or each scanning means may comprise a scanning mirror and a scanning motor, said scanning motor adapted to pivot said mirror causing a beam or beams reflected by the mirror to traverse at least a part of the substrate.

In such a preferred form there may be two processing laser beams simultaneously and/or alternately scanned on different parts of the moving substrate by alternate scanning means.

In a further preferred form said apparatus may further comprise dividing means adapted to divide the or each processing laser beam into at least two sub-beams. Preferably, said apparatus may further comprise realignment means adapted to realign said sub-beams to an adjacent relationship.

In one preferred form, said dividing means may divide the or each processing laser beam into three sub-beams.

Preferably, said focusing means may be adapted to separately focus each sub-beam.

In a further preferred form the apparatus of the present invention may further comprise interrupting means, adapted to interrupt the or each processing beam and/or sub-beam.

Preferably, the control means may enable variable control of the rate of scanning such that the cuts/welds may be straight or curved.

Preferably, the control means may further comprise monitoring means adapted to monitor progress of the substrate to correlate scanning with the location of indicators on the substrate.

Other aspects of the present invention may become apparent from the following description which is given by way of example only and with reference to the accompanying drawing.

MODES FOR CARRYING OUT THE INVENTION

Figure 1:
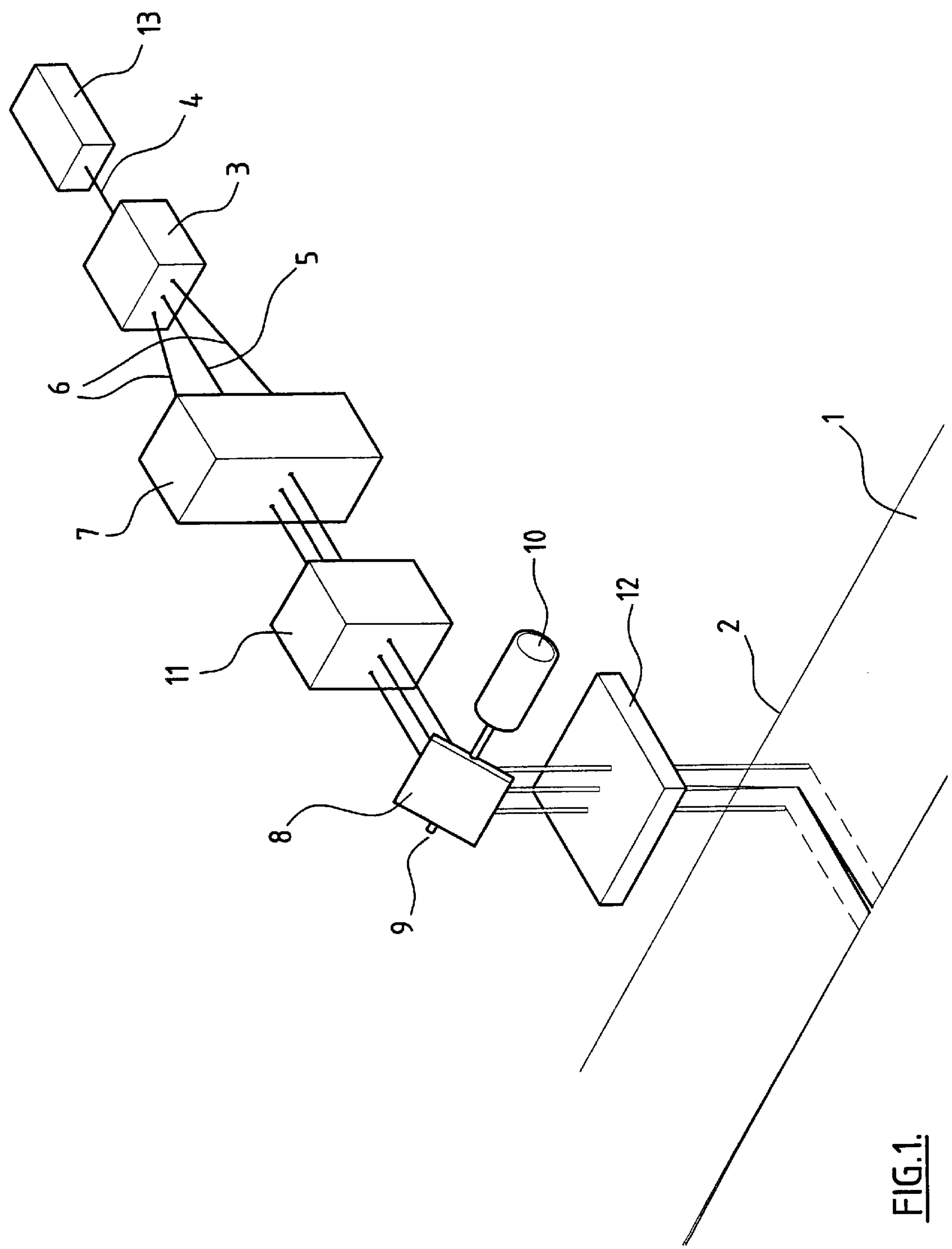
FIG. 1: shows a schematic representation of laser welding and/or cutting apparatus of the present invention.

The method and apparatus of the present invention are targeted primarily at the packaging industry for welding thermoplastic films such as polyethylene, polypropylene, polyamides, polycarbonate, ethylene-vinylacetate, polyester, polyvinyl chlorides, ethylene-vinylalcohol and surlyn, and foil and other such materials. Apparatus of the present invention includes a means of transporting two or more layers of a plastics material, forming the substrate 1, to a welding/cutting or operational site 2, at which site optically controlled laser beams are employed to perform the operational task required. The transportation is in the manner of a continuous feed.

At the welding/cutting site 2 means are provided for bringing the two or more films or webs of material into intimate contact with each other. This may be by any known means, including, for example, by projecting compressed air onto the substrate to force the layers together against a support, by having the films or webs pass over a tensioning means, by employing electrostatic charging of the substrate such that adjacent webs or films are charged oppositely, or by preheating one or more of the layers to make them, at least temporarily, adhere.

In one form the required contact may be provided by the substrate passing over a roller. The substrate may be tensioned over the roller by passing over it at an angle and by mechanical means employed to draw the substrate through the operational site and maintain tension throughout the cutting/welding process. This roller may have a surface which facilitates efficient action of the laser beams. For example, it may have a high coefficient of absorption for the wavelength of the laser beam, low thermal diffusivity and resistance to thermal shock.

The laser employed in the present invention may be a $CO_2$ laser, although it will be appreciated that the invention is not restricted to use of any particular type of laser, providing that it may be adapted to cut/weld thermoplastics material, foil or other materials used in the flexible packaging industry.

Referring to FIG. 1, optical means 3 are provided to divide the processing laser beam 4 into three separate sub-beams 5,6. The central beam 5 forms the cutting beam, and each of the lateral beams 6 forms a welding beam. The three separate beams 5,6 are brought back into an adjacent relationship by further optical means 7 and projected onto the substrate using an optical scanner.

The optical scanner comprises a scanning mirror 8 rotatable about a substantially horizontal axis 9 by a scanner motor 10, such that the beams 5,6 may be directed transversely across the substrate 1 by adjusting the tilt of the mirror.

The angle of the mirror 8 of the scanning means in relation to the direction of travel of the substrate 1 may be fixed, and control means (not shown) may be provided to control the relationship between the speed of the substrate and the speed of scanning, to ensure that the required direction of cut/weld is achieved.

The mirror 8 may be mounted at an angle to the direction of travel of the substrate such that, were the substrate stationery, the cut/weld produced by a scan would be angled slightly towards the direction of travel. The speed at which a scanner operates will be directly related to the speed at which the substrate travels, in order to obtain the desired shape of cut/weld. Typically, this will be a straight cut/weld at 90° to the direction of travel of the substrate. However, it will be appreciated that by controlling the speed of scanning in relation to the speed of travel of the substrate, and varying that relationship during a scan cuts/welds of substantially any curve or shape may be produced. This would be advantageous, for example, in producing customised bags of different shapes. The method and apparatus can even be used to carry out punching operations using a single or multiple processing laser beams, e.g. handle punch-type profiles for plastic bags.

The use of this type of optical scanner avoids the need for "flying optics" whereby a mirror is mechanically traversed across the width of the substrate. Such flying optics limit the speed at which a scan can be performed. With the scanning optics of the apparatus of the present invention there may be a limited angle of scan of about 20°. Thus, multiple scanners may be required for cutting/welding wide substrate. In this situation, there may be two or more lasers or a primary beam may be divided into at least two processing laser beams.

Each of these processing beams may be divided into three sub-beams, as described above, and each triplet is directed by optical means to, alternative optical scanners. The scanners may be positioned in series across the breadth of the substrate. Thus, the first processing beam may be directed to the first scanner which makes its maximum scan. The second processing beam simultaneously or consecutively, may then be directed to the second scanner which begins its scan from a point slightly overlapping the first scan. If more than two scanners are required, the first processing beam will then be redirected to the third scanner, and the second processing beam to the fourth scanner, and so on to complete the required weld/cut across the width of the substrate.

In the embodiment of FIG. 1 the laser beams are focused by focusing means 12 positioned after the optical scanner. That focusing means 12 may be adapted to focus each beam separately. It is also envisaged that the focusing means may be positioned before the optical scanner.

The distinction between the cutting 5 and welding 6 beams is achieved by the focusing means 12. In addition, the power density of the or each beam may be adjusted either at source (13), after separation if two or more processing beams are employed, or by a power density modifier 11 adapted to enable adjustment of each sub-beam relative to the other sub-beams. Separate power density modifiers may be employed for each beam or sub-beam.

Power density adjustment could be carried out either at the initial machine set up or during a scan. The power density would be modified according to thickness and/or nature of the substrate, speed of substrate web or webs, and speed and required profile of the scan.

Dividing each processing beam into three separate, independently controlled and manipulated beams enables a variety of seal configurations to be obtained, depending on how each beam is projected, pulsed or interrupted. For example, one or both of the weld beams may be interrupted so that only a cut is provided, or the cutting beam may be intermittently interrupted to produce a perforation. Moreover, by ramping up or down the power density in each beam, and employing a power density modifier, the apparatus of the present invention may be adapted to accommodate different substrates or substrates of different thickness, or even substrates having variable thickness in different regions such that the power density needs to be adjusted during a scan.

The types of seal configuration achievable with the apparatus of the present invention include, for example:

mixed welds, made up of two seals and a cut between the two seals, bottom welds, in which there is a single cut and weld, perforation on reel mixed welds, in which there are two seals with a perforation between the two seals, perforation on reel bottom welds, in which there is a single seal and a single perforation, and pouch seals in which there is one single wide seal with a cut down the middle of the seal.

Apparatus of the present invention may also be adapted to produce running seals in which the seals and/or cuts run in the direction of substrate travel.

Further, the apparatus may be employed to join different materials, if the material combination is weldable, such as plastic to metal foil.

Employing lasers also makes it possible to weld temperature resistant materials.

The apparatus of the present invention has particular application in the bag making industry since it requires no mechanical contact between the cutting/welding means and the substrate, and can weld/cut at high speed with a relatively simple base or feed machine and whilst the substrate is in continuous motion. There is no possibility of substrate sticking to sealing/cutting mechanisms.

The precise amount of heat required for cutting/welding using the apparatus of the present invention can be controlled to minimise heat generation. Therefore, shrink film can be welded with very little shrinkage and minimum cooling is required. Also there is no requirement for ramping in of dwell time or preheating of sealing mechanisms, simplifying the machinery or avoiding inefficiencies associated with scrap substrate at start up.

It will be appreciated that apparatus of the present invention may also be utilised in other sections of the packaging industry such as with form/fill/seal equipment.

The absence of contact between the cutting/welding means and the substrate, and the minimisation of moving parts, reduces maintenance requirements associated with cleaning, wear and degradation.

Other advantages associated with laser sealing are that thermal input is only required on one side of the substrate, and multi-layer substrates can be welded where the seal layer is of a material with a higher absorption of the laser energy and/or a lower melting point compared with the other layers of the substrate.

Sealing/cutting wattage can also be easily adjusted during operation to allow for different sealing conditions and gauge variations, and zone adjustable segmental heating is possible.

It will also be appreciated that with printed substrates, the control means adapted to control the one or more optical scanners of apparatus of the present invention may be employed to control the cutting/welding operation in register with the substrate, ensuring that each cut/weld is in the same position on each new repeat of printed matter. In this regard the control means may include a photocell, or the like, to scan or monitor the moving substrate and identify register marks/indicators on the substrate.

Where in the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope or spirit of the invention.

What is claimed is:

1. A method of cutting and/or welding flexible packaging material in motion, said method comprising:

feeding a substrate comprising two or more layers of flexible packaging material through an operational site, contacting adjacent layers of the material at said operational site, focusing one or more processing laser beams on said substrate at said operational site, scanning the or each processing laser beam on said moving substrate, by scanning means, to produce one or more cuts and/or welds in said substrate, and controlling the relationship between the rate of scanning and the rate of motion of the substrate to produce the one or more required cuts and/or welds.

2. A method according to claim 1 wherein the scanning comprises directing the or each processing laser beam at a scanning mirror and pivoting said scanning mirror to produce the required scan of the beam on the moving substrate.

3. A method according to claim 1 wherein there are a plurality of processing laser beams and scanning means, each scanning means adapted to scan a processing laser beam on a different part of the substrate.

4. A method according to claim 3 further comprising dividing the or each processing laser beam into at least two sub-beams, realigning said sub-beams and separately focusing each sub-beam.

5. A method according to claim 4 wherein the or each processing laser beam is divided into three sub-beams, one forming a central cutting beam and the other two forming lateral welding beams.

6. A method according to claim 5 further comprising interrupting, temporarily or intermittently, one or more of said processing beams and/or sub-beams.

7. A method according to claim 1 further comprising modifying the power density of the or each processing laser beam.

8. A method according to claim 1 wherein the rate of scanning in relation to the rate of motion of substrate is adjustable during scanning to enable cuts/welds of predetermined shape to be made.

9. A method according to claim 1 further comprising monitoring the progress of the substrate to correlate scanning with the location of indicators on the substrate.

10. Welding/cutting apparatus adapted for cutting and/or welding flexible packaging material in motion, said apparatus comprising:

feeding means adapted to feed a substrate comprising two or more layers of flexible packaging material through an operational site, contacting means adapted to produce intimate contact between adjacent layers of the substrate at the operational site, one or more lasers adapted to produce one or more processing laser beams, focusing means adapted to focus one or more processing laser beams on said substrate at the operational site, scanning means adapted to scan the one or more processing laser beam on the moving substrate to produce one or more cuts and/or welds in the substrate, and control means adapted to control the relationship between the rate of scanning and the rate of motion of the substrate to produce one or more required cuts and/or welds.

11. Cutting/welding apparatus according to claim 10 wherein there are a plurality of scanning means each adapted to scan a part of the substrate.

12. Cutting/welding apparatus according to claim 10 wherein the or each scanning means comprises a scanning mirror and a scanning motor, said scanning motor adapted to pivot said mirror thereby causing a beam or beams reflected by the mirror to traverse at least a part of the substrate.

13. Cutting/welding apparatus according to claim 12 wherein the or each scanning mirror is positioned at an angle in relation to the direction of travel of the substrate.

14. Cutting/welding apparatus according to claim 13 comprising two processing laser beams, each beam simultaneously and/or alternately scanned on different parts of the moving substrate by alternate scanning means.

15. Cutting/welding apparatus according to claim 10 further comprising dividing means adapted to divide the or each processing laser beam into at least two sub-beams.

16. Cutting/welding apparatus according to claim 15 further comprising realignment means adapted to realign said sub-beams to an adjacent relationship.

17. Cutting/welding apparatus according to claim 16 wherein said dividing means divides the or each processing laser beam into three sub-beams.

18. Cutting/welding apparatus according to claim 17 wherein the focusing means is adapted to separately focus each sub-beam.

19. Cutting/welding apparatus according to claim 18 further comprising interrupting means, adapted to interrupt the or each processing laser beam and/or sub-beam.

20. Cutting/welding apparatus according to claim 10 further comprising power density modification means adapted to enable modification of the power density of the or each processing laser beam and/or sub-beam.

21. Cutting/welding apparatus according to claim 10 wherein the control means enables variable adjustment of the rate of scanning such that the cuts/welds may be straight or curved.

22. Cutting/welding apparatus according to claim 10 wherein the control means further comprises monitoring means adapted to monitor progress of the substrate to correlate scanning with the location of indicators on the substrate.

23. Cutting/welding apparatus according to claim 22 wherein the monitoring means comprises a photocell and the indicators comprise register marks on a printed substrate.

24. A method according to claim 4 further comprising modifying the power density of the or each sub-beam.

25. Cutting/welding apparatus according to claim 15 further comprising power density modification means adapted to enable modification of the power density of the or each sub-beam.

* * * * *

UNITED STATES PATENT AND TRADEMARK OFFICE

CERTIFICATE OF CORRECTION

PATENT NO. : 6,207,925 B1
DATED : March 27, 2001
INVENTOR(S) : B. Kendall

It is certified that error appears in the above-identified patent and that said Letters Patent is hereby corrected as shown below:

Title page,
Item [30], Foreign Application Priority Data, "NL" should read -- NZ --

Column 1,
Line 54, "machinery, In" should read -- machinery. In --

Signed and Sealed this

Tenth Day of September, 2002

*Attest:*

JAMES E. ROGAN

*Attesting Officer*

*Director of the United States Patent and Trademark Office*